United States Patent
Kim et al.

(10) Patent No.: US 10,432,037 B2
(45) Date of Patent: Oct. 1, 2019

(54) WIRELESS POWER RECEIVER AND CONTROLLING METHOD THEREOF

(71) Applicant: Samsung Electronics Co., Ltd., Gyeonggi-do (KR)

(72) Inventors: Yu-Su Kim, Gyeonggi-do (KR); Se-Ho Park, Gyeonggi-do (KR); Sung-Ku Yeo, Gyeonggi-do (KR); Kang-Ho Byun, Gyeonggi-do (KR); Kyung-Woo Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/592,731

(22) Filed: May 11, 2017

(65) Prior Publication Data

US 2017/0250564 A1 Aug. 31, 2017

Related U.S. Application Data

(63) Continuation of application No. 13/779,207, filed on Feb. 27, 2013, now Pat. No. 9,685,811.

(30) Foreign Application Priority Data

Feb. 28, 2012 (KR) ........................ 10-2012-0020336

(51) Int. Cl.
*H02J 50/80* (2016.01)
*H02J 7/04* (2006.01)
(Continued)

(52) U.S. Cl.
CPC ............ *H02J 50/80* (2016.02); *H02J 7/0004* (2013.01); *H02J 7/025* (2013.01); *H02J 7/04* (2013.01);
(Continued)

(58) Field of Classification Search
CPC ....................................................... H02J 50/80
(Continued)

(56) References Cited

U.S. PATENT DOCUMENTS 4,377,758 A * 3/1983 Kiwaki ..................... H03F 9/04
307/417
5,565,756 A * 10/1996 Urbish ................ H01M 6/5033
320/103
(Continued)

FOREIGN PATENT DOCUMENTS

CN 1902779 1/2007
CN 101156294 4/2008
(Continued)

OTHER PUBLICATIONS

Chinese Office Action dated Mar. 1, 2017 issued in counterpart application No. 201310063030.2, 19 pages.
(Continued)

*Primary Examiner* — Jerry D Robbins
(74) *Attorney, Agent, or Firm* — The Farrell Law Firm, P.C.

(57) ABSTRACT

A method for controlling an electronic device including a charging circuit is provided. The method includes receiving power wirelessly from a power transmitting device; rectifying the received power; based on a voltage of the rectified power being greater than or equal to an allowable voltage of the charging circuit, controlling to convert the rectified power through a converting circuit of the electronic device and to output the converted power to the charging circuit for charging a battery of the electronic device, wherein the allowable voltage relates to a maximum voltage or a preferable voltage to be applied to the charging circuit; and based on the voltage of the rectified power being less than the allowable voltage of the charging circuit, controlling to stop converting the rectified power and to output the recti-
(Continued)

fied power to the charging circuit by connecting the rectifying circuit to the charging circuit.

14 Claims, 6 Drawing Sheets

(51) Int. Cl.
    *H02J 50/12*    (2016.01)
    *H02J 50/40*    (2016.01)
    *H02J 50/90*    (2016.01)
    *H02J 7/00*     (2006.01)
    *H02J 7/02*     (2016.01)
(52) U.S. Cl.
    CPC .............. *H02J 50/12* (2016.02); *H02J 50/40* (2016.02); *H02J 50/90* (2016.02)
(58) Field of Classification Search
    USPC ........................................................ 320/108
    See application file for complete search history.

(56) References Cited

U.S. PATENT DOCUMENTS

| | | | | |
|---|---|---|---|---|
| 5,568,037 | A * | 10/1996 | Massaroni | H02J 7/0004 320/106 |
| 6,252,373 | B1 * | 6/2001 | Stefansson | H02J 7/0093 320/106 |
| 2002/0060554 | A1 * | 5/2002 | Odaohhara | H02J 7/0073 320/134 |
| 2004/0193929 | A1 * | 9/2004 | Kuranuki | G06F 1/206 713/322 |
| 2005/0156569 | A1 * | 7/2005 | Patino | H01M 10/425 320/128 |
| 2006/0244424 | A1 | 11/2006 | Nelson | |
| 2009/0027013 | A1 * | 1/2009 | Odaohhara | H02J 7/0068 320/160 |
| 2009/0115374 | A1 * | 5/2009 | Noda | H01M 10/44 320/138 |
| 2011/0074343 | A1 * | 3/2011 | Chen | H01M 10/44 320/108 |
| 2011/0080053 | A1 | 4/2011 | Urano | |
| 2011/0127843 | A1 | 6/2011 | Karaoguz et al. | |
| 2011/0127954 | A1 * | 6/2011 | Walley | H01M 2/0267 320/108 |
| 2011/0193414 | A1 | 8/2011 | Furuichi et al. | |
| 2011/0279937 | A1 | 11/2011 | Signorelli et al. | |
| 2011/0285375 | A1 | 11/2011 | Deboy | |
| 2012/0229086 | A1 * | 9/2012 | Chi | H02J 3/01 320/109 |
| 2013/0026982 | A1 * | 1/2013 | Rothenbaum | H02J 17/00 320/108 |
| 2015/0155739 | A1 | 6/2015 | Walley et al. | |

FOREIGN PATENT DOCUMENTS

| | | |
|---|---|---|
| CN | 101291073 | 10/2008 |
| CN | 101355258 | 1/2009 |
| CN | 102082449 | 6/2011 |
| EP | 2 328 223 | 6/2011 |
| EP | 2 328 253 | 6/2011 |
| KR | 10-0566346 | 3/2006 |
| WO | WO 2007/094246 | 8/2007 |

OTHER PUBLICATIONS

Chinese Office Action dated Feb. 3, 2016 issued in counterpart application No. 201310063030.2, 18 pages.
European Search Report dated Dec. 5, 2017 issued in counterpart application No. 13157128.3-1804, 7 pages.
Korean Office Action dated Jun. 21, 2018 issued in counterpart application No. 10-2012-0020336, 6 pages.

* cited by examiner

WIRELESS POWER RECEIVER AND CONTROLLING METHOD THEREOF

PRIORITY

This continuation application claims priority under 35 U.S.C. § 120 to U.S. patent application Ser. No. 13/779,207, filed in the United States Patent and Trademark Office on Feb. 27, 2013, which claims priority under 35 U.S.C. § 119(a) to Korean Application Serial No. 10-2012-0020336, which was filed in the Korean Intellectual Property Office on Feb. 28, 2012, the contents of each of which are incorporated herein by reference.

BACKGROUND

1. Field of the Disclosure

The present disclosure relates generally to a wireless power receiver and a controlling method thereof, and more particularly, to a wireless power receiver that is adapted to receive wireless power based on a resonance system and a controlling method thereof.

2. Description of the Related Art

A mobile user equipment such as a cell phone or a PDA (Personal Digital Assistant) is generally driven by a rechargeable battery, and electric energy is supplied to the battery in order to recharge the battery, by using a separate recharging apparatus including separate contact terminals. The recharging apparatus and battery are electrically connected when the contact terminals are in contact with each other.

However, since such a contact charging system has contact terminals exposed to the outside, the contact terminals tend to become contaminated with foreign materials, which compromises the battery charge. In addition, the exposure to humidity further compromises the charging.

In order to solve the foregoing problems, wireless charging or non-contact charging has recently been developed, and is being utilized in many electronic apparatuses.

Such wireless charging system uses wireless power transmission/reception technology, which allows a battery to automatically charge by placement of the battery on a charging pad without connecting a cell phone to a separate charging connector. Examples of this wireless charging system are a wireless electric toothbrush or wireless electric shaver. This wireless charging system can enhance a waterproofing function by wirelessly charging electronic products and also enhance portability of the electronic apparatus because wire battery chargers are not required. Accordingly, the further development of such technologies is expected in the impending electric car era.

The wireless charging system roughly includes an electromagnetic induction system using coils, a resonance system using resonance, and a Radio Frequency (RF)/Micro Wave Radiation system which is performed by converting electric energy to a micro wave and transmitting the converted micro wave.

The electromagnetic induction system has been primarily used to this point, but success has been derived from recent experiments involving wireless transmission of electric power from a distance of a several tens of meters by using microwaves. Therefore, all electronic apparatuses is wirelessly charged in the near future.

A method for transmitting electric power by electromagnetic induction involves transmitting electric power between a first coil and a second coil. When a magnet moves on a coil, an induced current is generated. By using the induced current, a magnetic field is generated at a transmitting end, and an electric current is induced according to the change of the magnetic field and energy is generated at a receiving end. This phenomenon is referred to as an "electromagnetic phenomenon" and the electric power transmission method by using the same has excellent energy transmission efficiency.

In 2005, Professor Soljacic of the Massachusetts Institute of Technology (MIT) presented the resonance system, which enables electricity to be wirelessly transmitted to a charging unit even if the charging unit is several meters away, using resonance electric power transmission system by the Coupled Mode Theory. The wireless charging system of a research team in MIT uses a physics concept of resonance, in which when a tuning fork is sounding, a neighboring wine glass sounds at the same frequency. Instead of resonating sound, the research team resonated electromagnetic waves including electric energy. The resonating electric energy is directly transferred only when there is an apparatus having a resonant frequency, and unused parts do not spread in the air but are reabsorbed into electromagnetic fields. Therefore, unlike other electromagnetic waves, it is believed that there is no influence on neighboring machines or human bodies.

The wireless power receiver according to the conventional resonance system includes a rectifying circuit that converts received Alternating Current (AC) waveforms to Direct Current (DC) waveforms and a DC-DC converting circuit that adjusts the rectified electric power with DC waveforms to a predetermined voltage value of the output terminal. However, since the DC-DC converting circuit necessarily uses a passive element having a large external value, efficiency is compromised. In addition, the DC-DC converting circuit is an externally-packaged active element, so operation is generally performed in several MHz or less, which is inefficient.

Accordingly, it is required to develop a wireless power receiver that can minimize usage of the DC-DC converting circuit.

SUMMARY

An aspect of the present disclosure is to provide a wireless power receiver that does not use a DC-DC converting circuit when wireless power having a voltage lower than the allowable voltage of the charging unit is received, and a controlling method thereof.

In accordance with an aspect of the present disclosure, a method for controlling an electronic device including a charging circuit is provided. The method includes receiving power wirelessly from a power transmitting device; rectifying the received power; based on a voltage of the rectified power being greater than or equal to an allowable voltage of the charging circuit, controlling to convert the rectified power through a converting circuit of the electronic device and to output the converted power to the charging circuit for charging a battery of the electronic device, wherein the allowable voltage relates to a maximum voltage or a preferable voltage to be applied to the charging circuit; and based on the voltage of the rectified power being less than the allowable voltage of the charging circuit, controlling to stop converting the rectified power and to output the rectified power to the charging circuit by connecting the rectifying circuit to the charging circuit.

In accordance with another aspect of the present disclosure, an electronic device is provided. The electronic device includes a power receiver configured to receive power wirelessly from a power transmitting device; a rectifying circuit configured to rectify the received power; a converting circuit; a charging circuit; and a control unit configured to: based on a voltage of the rectified power being greater than or equal to an allowable voltage of the charging circuit, control to convert the rectified power through the converting circuit of the electronic device and to output the converted power to the charging circuit for charging a battery of the electronic device, wherein the allowable voltage relates to a maximum voltage or a preferable voltage to be applied to the charging circuit, and based on the voltage of the rectified power being less than the allowable voltage of the charging circuit, control to stop converting the rectified power and to output the rectified power to the charging circuit by connecting the rectifying circuit to the charging circuit.

In accordance with another aspect of the present disclosure, an electronic device is provided. The electronic device includes a power receiving circuit configured to receive power wirelessly from a power transmitting device; a rectifying circuit configured to rectify the received power; a charging circuit; a converting circuit that includes a first route for converting a voltage of the rectified power to a predetermined voltage and a second route for directly outputting the rectified power to the charging circuit, a control circuit configured to: based on a voltage of the rectified power being greater than or equal to an allowable voltage of the charging circuit, control the converting circuit to use the first route for converting the rectified power and to output the converted power to the charging circuit for charging a battery of the electronic device, wherein the allowable voltage relates to a maximum voltage or a preferable voltage to be applied to the charging circuit, and based on the voltage of the rectified power being less than the allowable voltage of the charging circuit, control the converting circuit to stop using the first route and to use the second route, to output the rectified power to the charging circuit.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT DISCLOSURE

Figure 1:
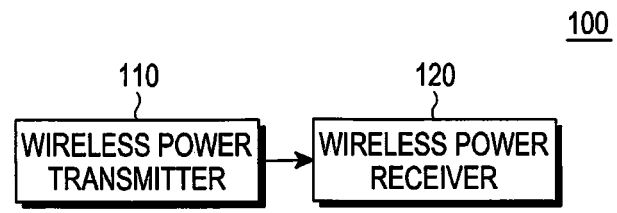
FIG. 1 illustrates a wireless power-receiving/transmitting system according to an embodiment of the present disclosure.

Hereinafter, embodiments of the present disclosure will be described with reference to the accompanying drawings. In the following description, the same elements will be designated by the same reference numerals although they are shown in different drawings. Herein, a detailed description of known functions and configurations incorporated herein will be omitted for the sake of clarity and conciseness.

FIG. 1 illustrates a wireless power-receiving/transmitting system according to an embodiment of the present disclosure. As illustrated in FIG. 1, the wireless power-receiving/transmitting system includes a wireless power transmitter 110 and a wireless power receiver 120. The wireless power transmitter 110 is electrically connected to the wireless power receiver 120. In the embodiment illustrated in FIG. 1, the wireless power transmitter 110 supplies wireless power to the wireless power receiver 120 in the form of electromagnetic waves.

The wireless power transmitter 110 performs a bidirectional communication with the wireless power receiver 120. The wireless power transmitter 110 and the wireless power receiver 120 include devices that can process or transmit/receive certain communication packets, and is realized by, for example, cell phones, Personal Data Assistants (PDAs), Portable Media Players (PMPs), or smart phones.

The wireless power transmitter 110 wirelessly provides electric power to at least one wireless power receiver 120. For example, the wireless power transmitter 110 transmits electric power to a plurality of wireless power receivers 120 by a resonance system. When the wireless power transmitter 110 adopts a resonance system, a distance between the wireless power transmitter 110 and the plurality of wireless power receivers 120 is preferably 30 m or less. In addition, when the wireless power transmitter 110 adopts an electromagnetic induction system, a distance between the wireless power transmitter 110 and the plurality of wireless power receiver is preferably 10 cm or less.

In addition, each wireless power receiver 120 transmits its own location information message, which is realized by short-range communication such as an RF signal or Bluetooth®, as will be described below in more detail.

In addition, the wireless power receiver 120 transmits charge state messages that indicate respective charge states to the wireless power transmitter 110.

The wireless power transmitter 110 includes a displaying unit such as a display so that respective states of the wireless power receiver 120 are displayed based on the messages received from the respective wireless power receiver 120. In addition, the wireless power transmitter 110 may also display estimated time until the respective wireless power receiver 120 is completely charged.

The wireless power transmitter 110 transmits control signals for disabling wireless charging functions to the wireless power receiver 120. The wireless power receiver that receive the control signals for disabling the wireless charging functions from the wireless power transmitter 110 may disable the wireless charging functions.

The wireless power receiver 120 receives wireless power from the wireless power transmitter 110 and charges a battery provided inside the device. In addition, the wireless power receiver 120 transmits signals for requesting wireless power transmission, information required for wireless power reception, state information of the wireless power receiver, and control information of wireless power transmitter 110, to the wireless power transmitter 110. The wireless power receiver 120 includes an electric power-receiving unit for receiving wireless power and a charging unit for charging the received wireless power, for example. The charging unit, which will be described below in more detail has an allowable voltage and the wireless power receiver 120 includes a converting unit, for example, so that the received voltage of the wireless power is converted to the allowable voltage or below.

Figure 2:
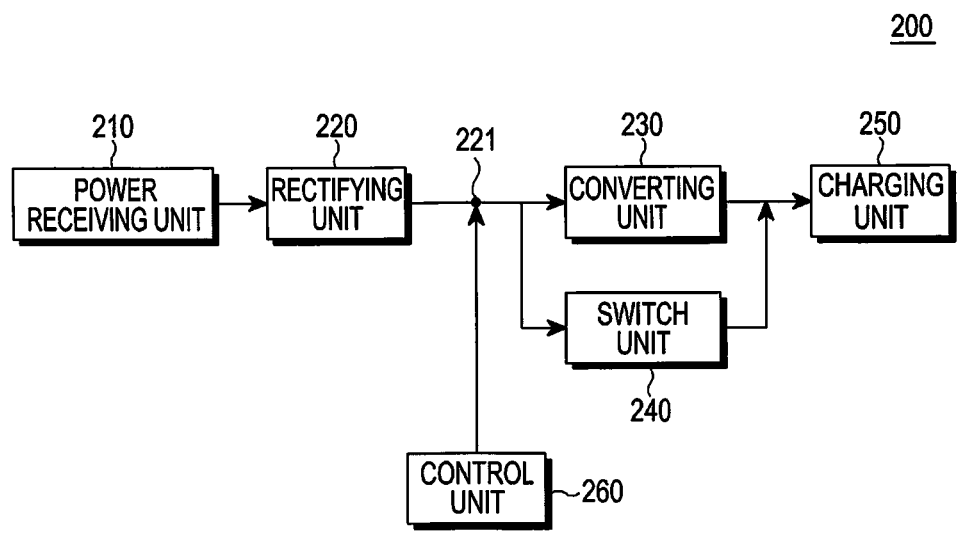
FIG. 2 illustrates a wireless power receiver according to an embodiment of the present disclosure.

FIG. 2 illustrates a wireless power receiver according to an embodiment of the present disclosure.

As illustrated in FIG. 2, the wireless power receiver 200 includes an electric power-receiving unit 210, a rectifying unit 220, a converting unit 230, a switching unit 240, a charging unit 250, and a control unit 260.

The electric power-receiving unit 210 receives wireless power when resonating with an electromagnetic field output from a wireless power supplier. If the electric power-receiving unit 210 is realized by a loop coil, the inductance L of the loop coil is changeable, and therefore, various frequencies of electromagnetic waves (or wireless power) are received. The loop coil includes at least one winding, and can be of any operable winding form.

The rectifying unit 220 rectifies received wireless power to output DC wireless power and includes at least one diode, which may be realized to the form of a full-bridge diode. The rectifying unit 220 is realized by full-wave rectification or half-wave rectification.

The converting unit 230 converts the voltage of the electric power rectified by the rectifying unit 220 into a predetermined voltage, and is realized by a DC-DC converter, for example. The converting unit 230 converts the voltage of the rectified electric power into a voltage within the allowable voltage of the charging unit 250, and the converting unit 230 converts the voltage of the rectified electric power into 5 V, for example. The converting unit 230 converts the voltage of the rectified electric power into a voltage within the allowable voltage of the charging unit 250 to prevent an excessive voltage from being applied to the charging unit 250.

The switching unit 240 connects one end of the rectifying unit 220 to one end of the charging unit 250 and connects or disconnects the one end of the rectifying unit 220 and the one end of the charging unit 250 according to the control of the control unit 260. The switching unit 240 is realized by a free-wheeling switch, a load switch, an n-type MOSFET element, or a p-type MOSFET element, and it is easily understood by those skilled in the art that there is no limitation provided that the unit can connect or disconnect the rectifying unit 220 and the charging unit 250 by the control of the control unit 260.

The charging unit 250 stores wireless power converted by the converting unit 230, or stores wireless power directly output from the rectifying unit 220 by the switching unit 240. The charging unit 250 is realized by an electric power-storing unit, such as a battery. The charging unit 250 includes other elements of the wireless receiver 200 that use electric power other than the electric power stored in the charging unit 250.

The control unit 260 controls the entire operations of the wireless power receiver 200. The control unit 260 monitors a voltage at an output terminal 221 of the rectifying unit 220. If the voltage at the output terminal 221 of the rectifying unit 220 is equal to or higher than the allowable voltage of the charging unit 250, the control unit 260 controls the converting unit 230 so that the voltage of the electric current output from the rectifying unit 220 is converted to a voltage lower than the allowable voltage. If the voltage at the output terminal 221 of the rectifying unit 220 is lower than the allowable voltage of the charging unit 250, the control unit 260 controls the switching unit 240 so that the wireless power output from the rectifying unit 220 is directly transmitted to the charging unit 250.

That is, if the voltage at the output terminal 221 of the rectifying unit 220 is lower than the allowable voltage of the charging unit 250, the control unit 260 performs control so that the rectified wireless power is not converted. Accordingly, if the voltage at the output terminal 221 of the rectifying unit 220 is lower than the allowable voltage of the charging unit 250, the control unit 260 connects the switching unit 240. In addition, if the voltage at the output terminal 221 of the rectifying unit 220 is equal to or higher than the allowable voltage of the charging unit 250, the control unit 260 opens the switching unit 240. The configuration in which the control unit 260 recognizes the allowable voltage of the charging unit 250 will be described below in more detail. The control unit 260 includes a comparing unit such as a comparator, in order to compare both voltages.

According to the embodiment described above, if the voltage at the output terminal 221 of the rectifying unit 220 is lower than the allowable voltage of the charging unit 250, the converting may not be performed. This prevents a loss of efficiency, which would likely occur in the converting process.

In addition to the embodiment described above, the configuration is possible in which the switching unit 240 is provided inside the converting unit 230. That is, the converting unit 230 includes a first route for converting and a second route for directly connecting to the charging unit 250. Based on the determination result of the control unit 260, if converting is required, the converting unit 230 performs converting by using the first route. In addition, if converting is not required, the converting unit 230 outputs wireless power directly to the charging unit 250 through the second route without performing converting.

Figure 3:
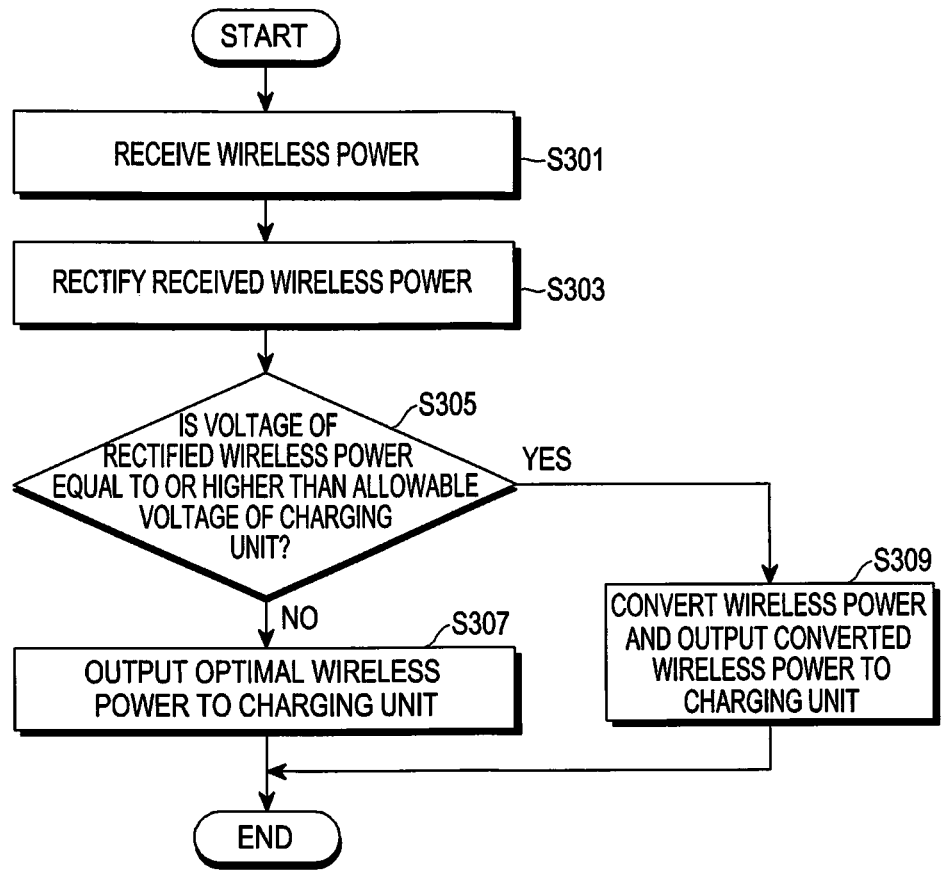
FIG. 3 illustrates a method for controlling a wireless power receiver according to an embodiment of the present disclosure.

FIG. 3 illustrates a method for controlling a wireless power receiver according to an embodiment of the present disclosure.

The wireless power receiver receives wireless power from the wireless power transmitter in step S301. The wireless power receiver receives wireless power from the wireless power transmitter, for example, based on a resonance system. The wireless power received by the wireless power receiver is in an AC form with a certain voltage.

The wireless power receiver rectifies the received wireless power in step S303. As described above, the wireless power receiver includes at least one diode such as a full-bridge diode, to rectify the received wireless power.

The wireless power receiver determines whether the voltage of the rectified wireless power is equal to or higher than the allowable voltage of the charging unit in step S305. The wireless power receiver includes a voltage-comparing unit such as a comparator, and compares the voltage of the rectified wireless power to the allowable voltage of the charging unit.

If the voltage of the rectified wireless power is equal to or higher than the allowable voltage of the charging unit in step S305-Y, the wireless power receiver converts the voltage of the rectified wireless power to a voltage lower than the allowable voltage of the charging unit and outputs the wireless power to the charging unit in step S309. If the voltage of the rectified wireless power is lower than the allowable voltage of the charging unit in step S305-N, the wireless power receiver directly outputs the rectified wireless power to the charging unit in step S307.

According to the embodiment described above, if the voltage of the rectified wireless power is lower than the allowable voltage of the charging unit, converting is not performed. This prevents the loss of efficiency, which may occur in the converting process.

Figure 4:
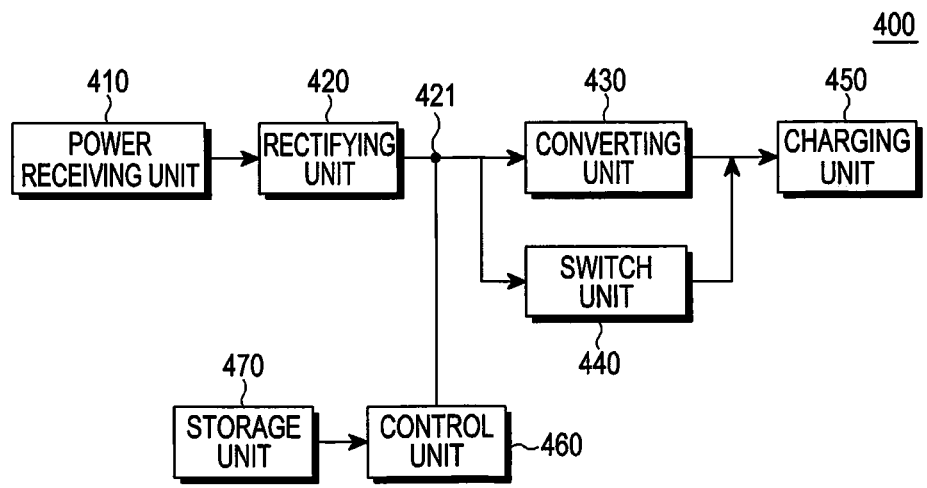
FIG. 4 illustrates a wireless power receiver according to an embodiment of the present disclosure.

FIG. 4 illustrates a wireless power receiver according to an embodiment of the present disclosure.

As illustrated in FIG. 4, the wireless power receiver 400 includes an electric power-receiving unit 410, a rectifying unit 420, a converting unit 430, a switching unit 440, a charging unit 450, and a control unit 460.

When the electric power-receiving unit 410 resonates with an electromagnetic field output from the wireless power supplier, the electric power-receiving unit 410 receives wireless power. The rectifying unit 420 rectifies the received wireless power to output DC wireless power. The converting unit 430 converts the voltage of the electric power rectified by the rectifying unit 420 to a predetermined voltage within the allowable voltage of the charging unit 450, and the converting unit 430 converts the voltage of the rectified electric power to 5 V, to prevent an excessive voltage from being applied to the charging unit 450.

The switching unit 440 connects one end of the rectifying unit 420 and one end of the charging unit 450, and the one end of the rectifying unit 420 and the one end of the charging unit 450 are connected or disconnected according to the control of the control unit 460. The charging unit 450 stores wireless power converted by the converting unit 430 or stores wireless power directly output from the rectifying unit 420 by the switching unit 440.

The control unit 460 controls the entire operations of the wireless power receiver 400. The control unit 460 monitors the voltage of the output terminal 421 of the rectifying unit 420. If the voltage at the output terminal 421 of the rectifying unit 420 is higher than the allowable voltage of the charging unit 450, the control unit 460 controls the converting unit 430 so that the voltage of the electric current output from the rectifying unit 420 is converted to a voltage lower than the allowable voltage. In addition, if the voltage at the output terminal 421 of the rectifying unit 420 is lower than the allowable voltage of the charging unit 450, the control unit 460 controls the switching unit 440 so that the wireless power output from the rectifying unit 420 is directly transmitted to the charging unit 450.

If the voltage at the output terminal 421 of the rectifying unit 420 is lower than the allowable voltage of the charging unit 450, the control unit 460 connects the switching unit 440. In addition, if the voltage at the output terminal 421 of the rectifying unit 420 is equal to or higher than the allowable voltage of the charging unit 450, the control unit 460 opens the switching unit 440.

The control unit 460 compares the voltage at the output terminal 421 of the rectifying unit 420 and the allowable voltage based on information on the allowable voltage of the charging unit 450 read from the storage unit 470. The storage unit 470 includes information on the allowable voltage of the charging unit 450. The storage unit 470 stores programs, applications, and algorithms for the entire operation of the wireless power receiver 400 in addition to the allowable voltage of the charging unit 450. The storage unit 470 is realized by a volatile or non-volatile memory, and there is no limitation to the memory provided that the unit can store the allowable voltage information.

Figure 5:
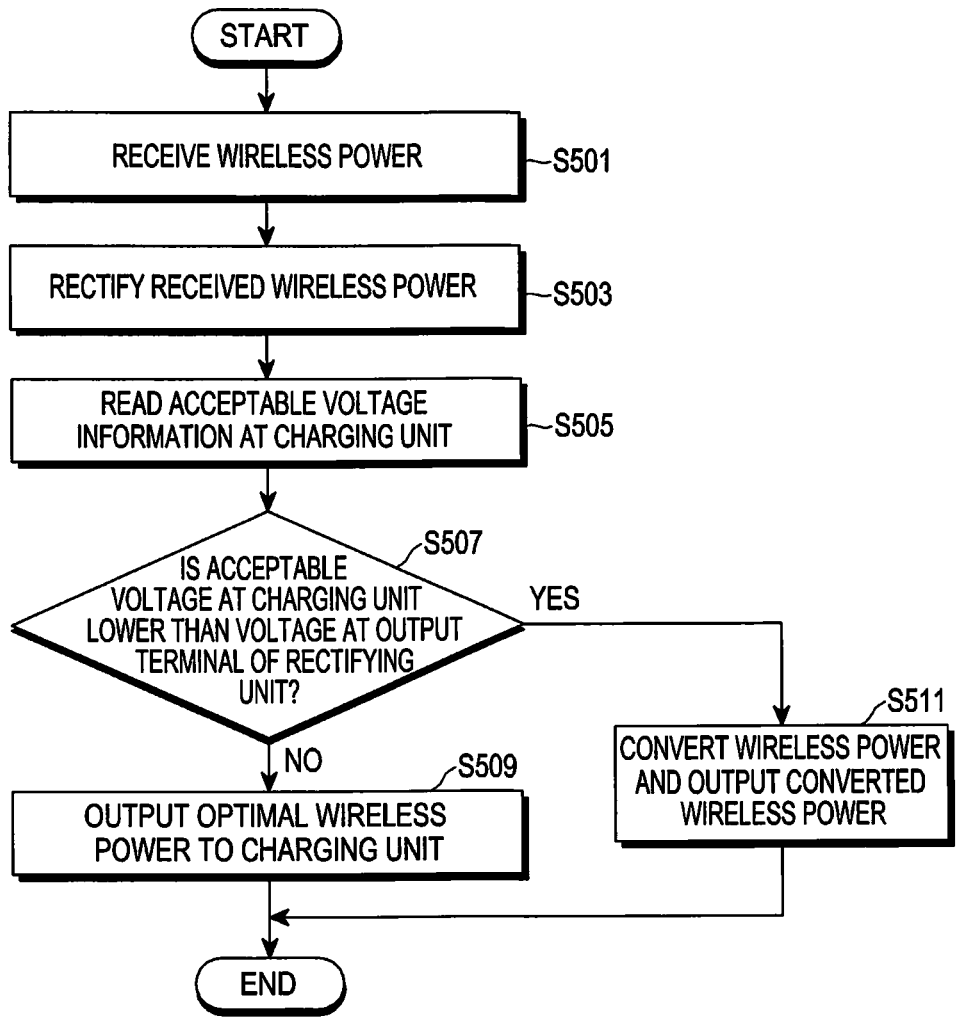
FIG. 5 illustrates a method for controlling a wireless power receiver according to an embodiment of the present disclosure.

FIG. 5 illustrates a method for controlling a wireless power receiver according to an embodiment of the present disclosure.

The wireless power receiver receives wireless power from the wireless power transmitter in step S501, based on a resonance system, for example. The wireless power received by the wireless power receiver may have a DC form with a certain voltage.

The wireless power receiver rectifies the received wireless power in step S503, and includes at least one diode such as a full-bridge diode, to rectify the received wireless power.

The wireless power receiver reads previously stored information on the allowable voltage of the charging unit in step S505. The information on the allowable voltage of the charging unit relates to the maximum voltage that can be applied to the charging unit or a voltage to be preferably applied to the charging unit, for example.

The wireless power receiver determines whether the voltage of the rectified wireless power is equal to or higher than the allowable voltage of the charging unit based on the read information on the allowable voltage of the charging unit in step S507. The wireless power receiver includes a voltage-comparing unit such as a comparator, and compares the voltage of the rectified wireless voltage and the allowable voltage of the charging unit.

If the voltage of the rectified wireless power is equal to or higher than the allowable voltage of the charging unit in step S507-Y, the wireless power receiver converts the voltage of the rectified wireless power to be lower than the allowable voltage of the charging unit and output the converted voltage to the charging unit in step S511.

If the voltage of the rectified wireless power is lower than the allowable voltage of the charging unit (S507-N), the wireless power receiver directly outputs the rectified wireless power to the charging unit in step S509.

According to the embodiment as described above, if the voltage of the rectified wireless power is lower than the allowable voltage of the charging unit, converting may not be performed. Accordingly, the loss of efficiency is prevented.

Figure 6:
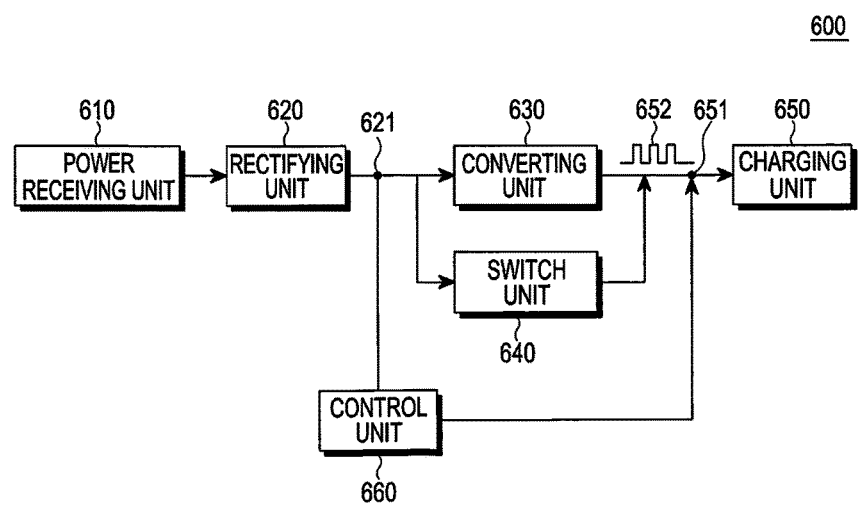
FIG. 6 illustrates a wireless power receiver according to an embodiment of the present disclosure.

FIG. 6 illustrates a wireless power receiver according to an embodiment of the present disclosure.

As illustrated in FIG. 6, a wireless power receiver 600 includes an electric power-receiving unit 610, a rectifying unit 620, a converting unit 630, a switching unit 640, a charging unit 650, and a control unit 660.

When the electric power-receiving unit 610 resonates with an electromagnetic field output from the wireless power supplier, the electric power-receiving unit 610 receives wireless power. The rectifying unit 620 rectifies the received wireless power to output DC wireless power. The converting unit 630 converts the voltage of the rectified electric power to the predetermined voltage by the rectifying unit 620. The converting unit 630 converts the voltage of the rectified electric power to a voltage within the allowable voltage of the charging unit 650, and the converting unit 630 converts the voltage of the rectified electric power to 5 V, for example. The converting unit 630 converts the voltage of the rectified electric power into a voltage within the allowable voltage of the charging unit 650 to prevent an excessive voltage from being applied to the charging unit 650.

The switching unit 640 can connect one end of the rectifying unit 620 and one end of the charging unit 650, and connect or disconnect the one end of the rectifying unit 620 and one end of the charging unit 650 according to the control of the controlling unit 660. The charging unit 650 stores wireless power converted by the converting unit 630, or stores wireless power directly output from the rectifying unit 620 by the switching unit 640.

The control unit 660 controls the entire operations of the wireless power receiver 600. The control unit 660 monitors the voltage of the output terminal 621 of the rectifying unit 620 and the electric current 652 flowing at an input terminal 651 of the charging unit 650.

The control unit 660 performs control so that the switching unit 640 is open during a first period and the converting unit 630 converts the voltage of the rectified wireless power to a certain voltage and the converted wireless power is transmitted to the charging unit 650. During the first period, the charging unit 650 receives wireless power wirelessly converted to a square waveform 652. More specifically, the charging unit 650 receives converted wireless power having a predetermined number of crests of square waves during the first period. The predetermined number of crests of the square waves corresponds to information on the allowable voltage of the charging unit 650. For example, if the allowable voltage of the charging unit 650 is 5 V, the charging unit 650 receives square waves having 5 crests during the first period. The number of crests of the square waves corresponds to the number of volts of the allowable voltage of the charging unit 650. Accordingly, for example, if the allowable voltage of the charging unit 650 is 4.5 V, the charging unit receives the square waves having 4 crests. The control unit 660 may recognize information on the allowable voltage of the charging unit 650 by the number of crests of the square waves input to the charging unit 650 during the first period.

Based on the information on the allowable voltage of the charging unit 650 recognized in the first period, the control unit 660 performs control so that the rectified wireless power is converted or not converted and the wireless power is transmitted to the charging unit 650 during a second period. The operation of control unit 660 during the second period will be described.

If the voltage at the output terminal 621 of the rectifying unit 620 is equal to or higher than the allowable voltage of the charging unit 650, the control unit 660 controls the converting unit 630 so that the voltage of the electric current output from the rectifying unit 620 is converted to be lower than the allowable voltage. If the voltage at the output terminal 621 of the rectifying unit 620 is lower than the allowable voltage of the charging unit 650, the control unit 660 controls the switching 640 so that the wireless power output from the rectifying unit 620 is directly transferred to the charging unit 650.

If the voltage at the output terminal 621 of the rectifying unit 620 is lower than the allowable voltage of the charging unit 650, the control unit 660 connects the switching unit 640. If the voltage at the output terminal 621 of the rectifying unit 620 is equal to or higher than the allowable voltage of the charging unit 650, the control unit 660 opens the switching unit 640.

Figure 7:
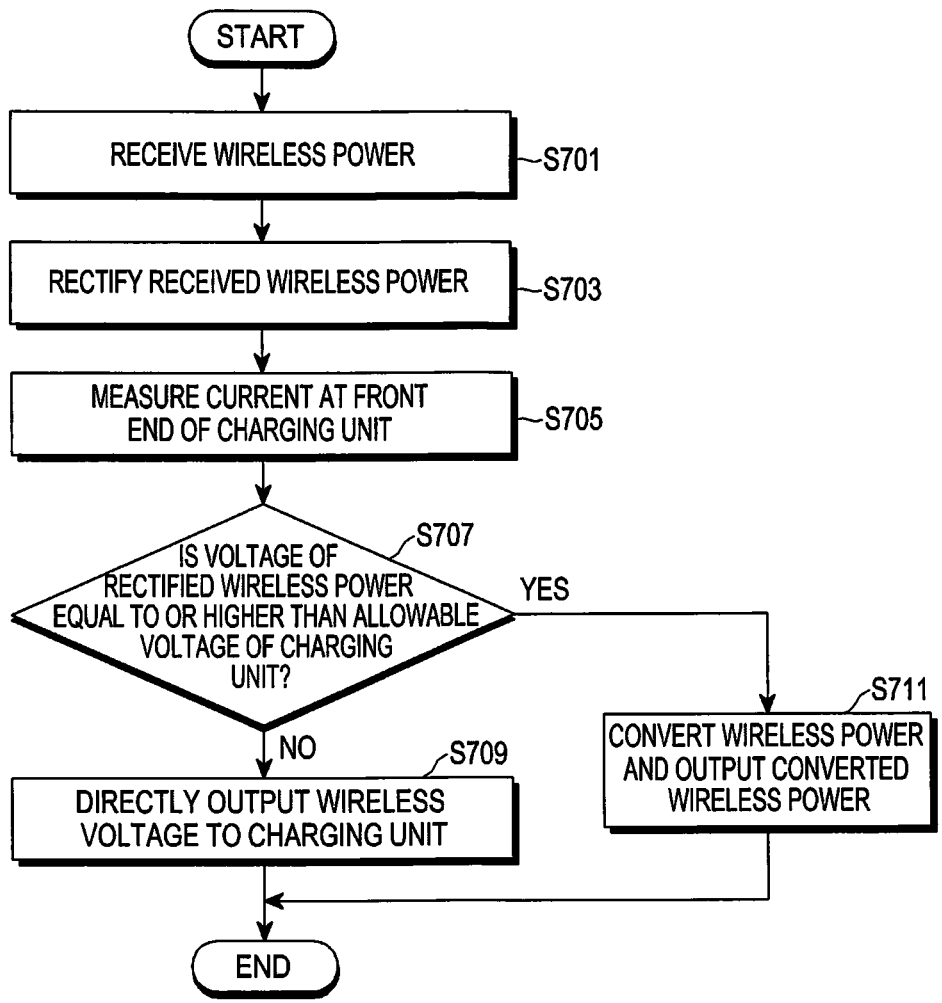
FIG. 7 illustrates a method for controlling a wireless power receiver according to an embodiment of the present disclosure.

FIG. 7 illustrates a method for controlling a wireless power receiver according to an embodiment of the present disclosure.

The wireless power receiver receives wireless power from a wireless power transmitter in step S701, based on a resonance system, for example. The wireless power received by the wireless power receiver has an AC form having a certain voltage.

The wireless power receiver rectifies the received wireless power in step S703. As discussed above, the wireless power receiver includes at least one diode such as a full-bridge diode, to rectify the received wireless power.

The wireless power receiver may measure the electric current transferred to a charging unit at the front terminal of the charging unit in step S705. The electric current transferred to the charging unit may have a square waveform. The charging unit receives the converted wireless power having a predetermined number of crests of square waves, and the predetermined number of crests of the square waves corresponds to information on the allowable voltage of the charging unit. For example, if the allowable voltage of the charging unit is 5 V, the charging unit receives square waves having 5 crests during a first period. The information on the allowable voltage of the charging unit relates to the maximum voltage that can be applied to the charging unit or a voltage to be preferably applied to the charging unit, for example.

The wireless power receiver determines whether the voltage of the rectified wireless power is equal to or higher than the allowable voltage of the charging unit based on the read information on the allowable voltage of the charging unit in step S707. The wireless power receiver includes a voltage-comparing unit such as a comparator, and compares the voltage of the rectified wireless voltage and the allowable voltage of the charging unit.

If the voltage of the rectified wireless power is equal to or higher than the allowable voltage of the charging unit in step S707-Y, the wireless power receiver converts the voltage of the rectified wireless power to be lower than the allowable voltage of the charging unit and output the converted voltage to the charging unit in step S711. If the voltage of the rectified wireless power is lower than the allowable voltage of the charging unit in step S707-N, the wireless power receiver may directly output the rectified wireless power to the charging unit in step S709.

According to the embodiment as described above, if the voltage of the rectified wireless power is lower than the allowable voltage of the charging unit, converting is not performed. Accordingly, the loss of efficiency is prevented.

Figure 8:
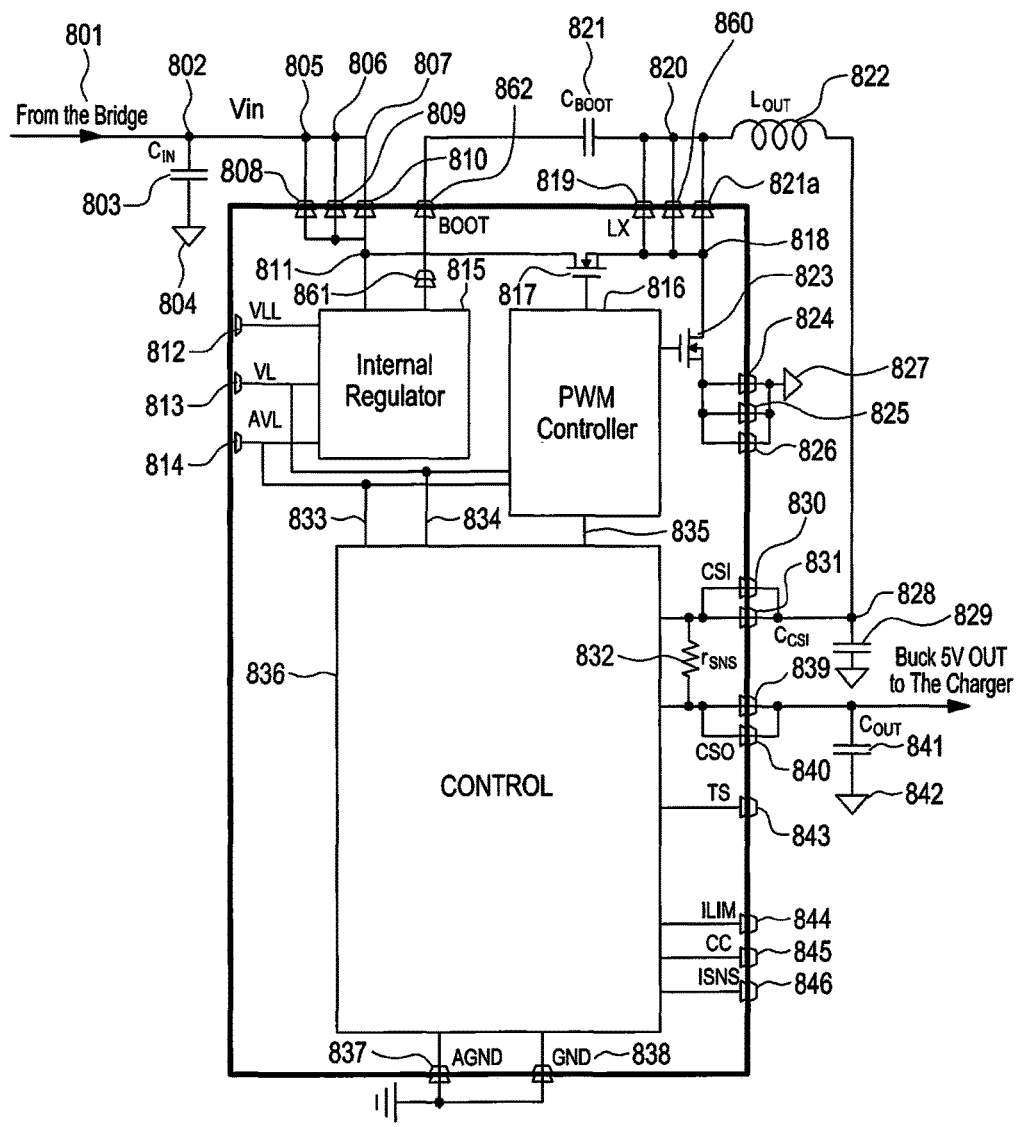
FIG. 8 illustrates a wireless power receiver according to an embodiment of the present disclosure.

FIG. 8 illustrates a wireless power receiver according to an embodiment of the present disclosure.

As illustrated in FIG. 8, a rectifying unit 801 realized by, for example, a bridge is connected by a node 802. The node 802 is connected to one end of a capacitor 803, and the other end of the capacitor 803 is connected to a ground 804. In addition, the node 802 is connected to other nodes 805, 806, and 807 which are connected to one end of diodes 808, 809, and 810, respectively. The other ends of the diodes 808, 809, and 810 are connected to a node 811. The node 811 is connected to an internal regulator 815. A first input (VLL) 812, a second input (VL) 813, and a third input (AVL) 814 are input to the internal regulator 815. The second input (VL) is connected to a PWM controller 816. In addition, the second input (VL) may have a connection 834 to the controller 836. The third connection (AVL) may have a connection to the PWM controller 816, and further a connection 833 to the controller 836.

The controller 836 is connected to one end of diodes 838 and 837 and the other end of the diodes 838 and 837 is connected to a ground. The internal regulator 815 is connected to one end of the diode 861, and the other end of the diode 861 is connected to one end of the diode 862. The other end of the diode 862 is connected to one end of the capacitor 821, and the other end of the capacitor 821 is connected to a node 820. The node 820 is connected to one end of a coil 822 and one ends of the capacitors 819, 860, and 821. The other end of the capacitors 819, 860, and 821 is connected to a node 818. The nodes 811 and 818 are connected to a transistor 817, and a gate end of the transistor 817 is connected to the PWM controller 816. The node 818 is connected to a transistor 823, and a gate end of the transistor 823 is connected to a PWM controller 816.

The transistor 823 is connected to one end of diodes 824, 825, and 826. The other end of the diodes 824, 825, and 826 is connected to ground 827. The other end of the coil 822 is connected to a node 828, which is connected to one end of a capacitor 829 and one end of diodes 830 and 831. The other end of the capacitor 829 is connected to a ground. The other end of the diodes 830 and 831 is connected to one end of the controller 836 and a resistance 832. The other end of the resistance 832 is connected to one end of the diodes 839 and 840 connected in parallel. The other end of the diodes 839 and 840 is connected to one end of the charging unit and the capacitor 841. The other end of the capacitor 841 is connected to a ground 842. The controller 836 receives various control signals 837, 838, 843, 844, 845, and 846.

While the present disclosure has been shown and described with reference to certain embodiments thereof, it will be understood by those skilled in the art that various changes in form and details is made therein without departing from the spirit and scope of the present disclosure as defined by the appended claims. Therefore, several modifications are possible without departing from the gist of the present disclosure as defined by the appended claims. It should be understood that the modifications remain within the technical ideas and overviews of the disclosure.

What is claimed is:

1. A method for controlling an electronic device including a charging circuit, the method comprising:
    receiving power wirelessly from a power transmitting device;
    rectifying, through a rectifying circuit of the electronic device, the received power;
    comparing a voltage of the rectified power with an allowable voltage of the charging circuit;
    in response to the voltage of the rectified power being greater than or equal to the allowable voltage of the charging circuit, controlling a converting circuit of the electronic device to convert the rectified power and to output the converted power to the charging circuit for charging a battery of the electronic device, wherein the allowable voltage relates to a maximum voltage or a preferable voltage to be applied to the charging circuit; and
    in response to the voltage of the rectified power being less than the allowable voltage of the charging circuit, controlling to output the rectified power directly to the charging circuit by allowing the rectified power to bypass the converting circuit.

2. The method for controlling the electronic device according to claim 1, further comprising:
    reading information on the allowable voltage of the charging circuit; and
    comparing the voltage of the rectified power to the allowable voltage of the charging circuit based on the read information on the allowable voltage.

3. The method for controlling the electronic device according to claim 1, further comprising:
    receiving information on the allowable voltage of the charging circuit from the charging circuit; and
    comparing the voltage of the rectified power to the allowable voltage of the charging circuit based on the received information on the allowable voltage.

4. The method for controlling the electronic device according to claim 1, further comprising:
    receiving electrical currents of square waves by the charging circuit during a predetermined time.

5. The method for controlling the electronic device according to claim 4, wherein the information on the allowable voltage is based on a number of crests of the square waves received during the predetermined time.

6. The method for controlling the electronic device according to claim 5, wherein the number of crests of the square waves corresponds to a volt unit of the allowable voltage of the charging circuit.

7. An electronic device, comprising:
    a power receiver configured to receive power wirelessly from a power transmitting device;
    a rectifying circuit configured to rectify the received power;
    a converting circuit;
    a charging circuit;
    and
    a control unit configured to:
    compare a voltage of the rectified power with an allowable voltage of the charging circuit;
    in response to the voltage of the rectified power being greater than or equal to the allowable voltage of the charging circuit, control the converting circuit to convert the rectified power and to output the converted power to the charging circuit for charging a battery of the electronic device, wherein the allowable voltage relates to a maximum voltage or a preferable voltage to be applied to the charging circuit, and
    in response to the voltage of the rectified power being less than the allowable voltage of the charging circuit, control to output the rectified power directly to the charging circuit by allowing the rectified power to bypass the converting circuit.

8. The electronic device according to claim 7, further comprising a storage circuit that stores information on the allowable voltage of the charging circuit,
    wherein the control circuit is further configured to read the information on the allowable voltage and compare the voltage of the rectified power to the allowable voltage of the charging circuit based on the read information on the allowable voltage.

9. The electronic device according to claim 7,
    wherein the control circuit is further configured to receive the information on the allowable voltage of the charging circuit from the charging circuit, and compare the voltage of the rectified power to the allowable voltage of the charging circuit based on the received information on the allowable voltage.

10. The electronic device according to claim 7, wherein the charging circuit is further configured to receive electrical currents of square waves during a predetermined time.

11. The electronic device according to claim 10, wherein the information on the allowable voltage is based on a number of crests of the square waves received during the predetermined time.

12. The electronic device according to claim 11, wherein the number of crests of the square waves corresponds to a volt unit of the allowable voltage of the charging circuit.

13. An electronic device, comprising:
    a power receiving circuit configured to receive power wirelessly from a power transmitting device;
    a rectifying circuit configured to rectify the received power;
    a charging circuit;
    a converting circuit that includes a first route for converting a voltage of the rectified power to a predetermined voltage and a second route for directly outputting the rectified power to the charging circuit,
    a control circuit configured to:
    compare a voltage of the rectified power with an allowable voltage of the charging circuit;
    in response to the voltage of the rectified power being greater than or equal to the allowable voltage of the charging circuit, control the converting circuit to convert the rectified power through the first route and to output the converted power to the charging circuit for charging a battery of the electronic device, wherein the allowable voltage relates to a maximum voltage or a preferable voltage to be applied to the charging circuit, and in response to the voltage of the rectified power being less than the allowable voltage of the charging circuit, control to output the rectified power directly to the charging circuit through the second route by allowing the rectified power to bypass the converting circuit.

14. The method for controlling the electronic device according to claim 1, further comprising:

providing, by using a switch, a route for the rectified power to bypass the converting circuit.

* * * * *